March 30, 1937.  J. H. SHERTS  2,075,667
PROCESS FOR MAKING SAFETY GLASS
Filed June 3, 1936  3 Sheets-Sheet 1
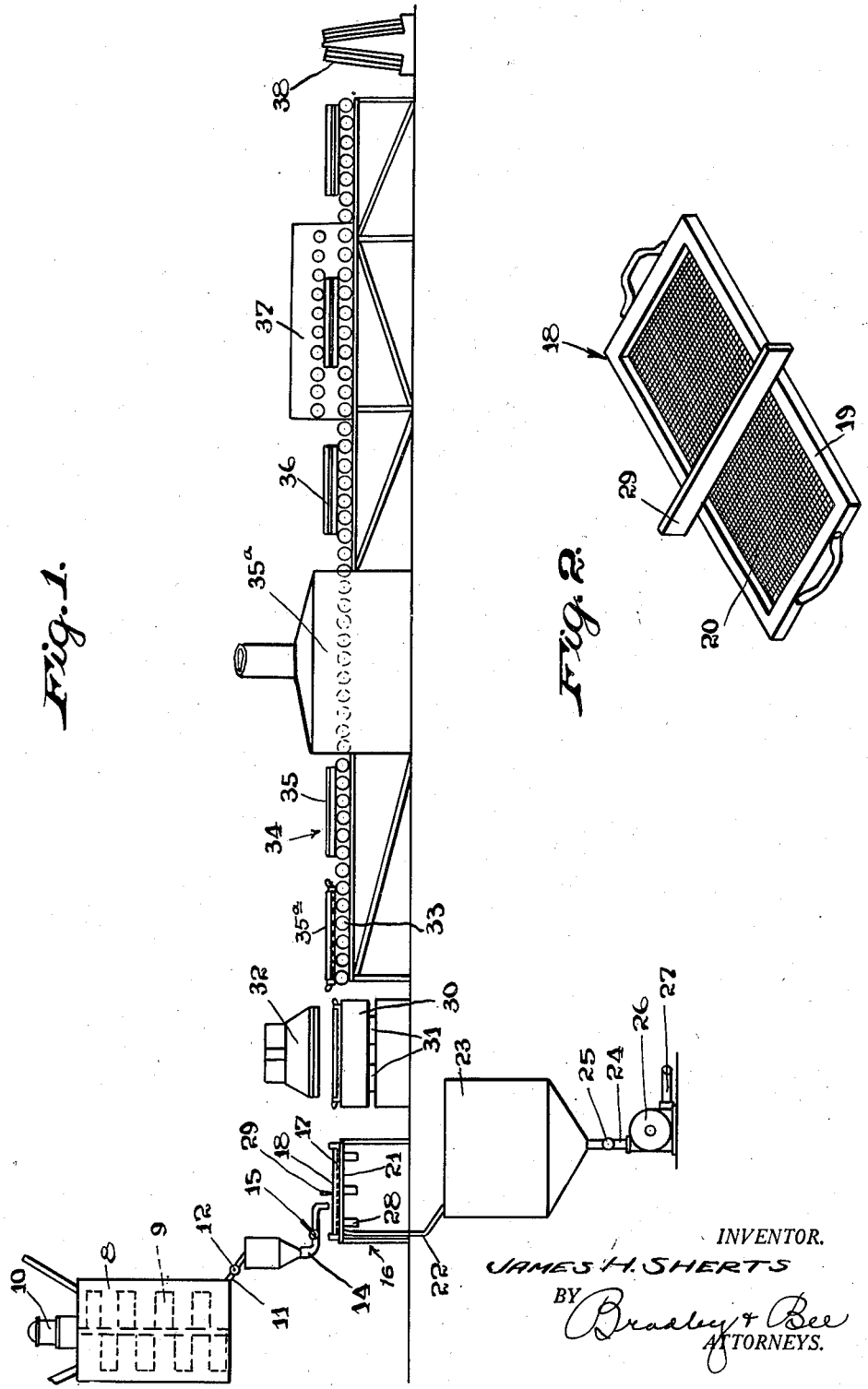
INVENTOR.
JAMES H. SHERTS
BY Bradley & Bee
ATTORNEYS.

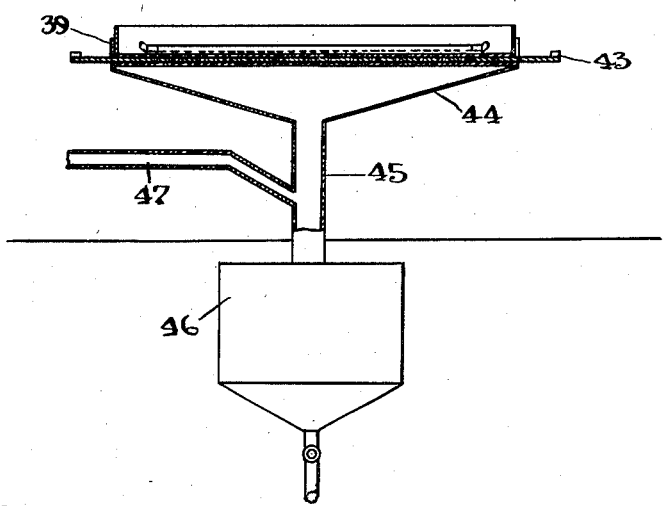
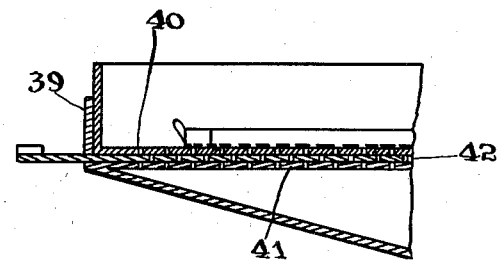
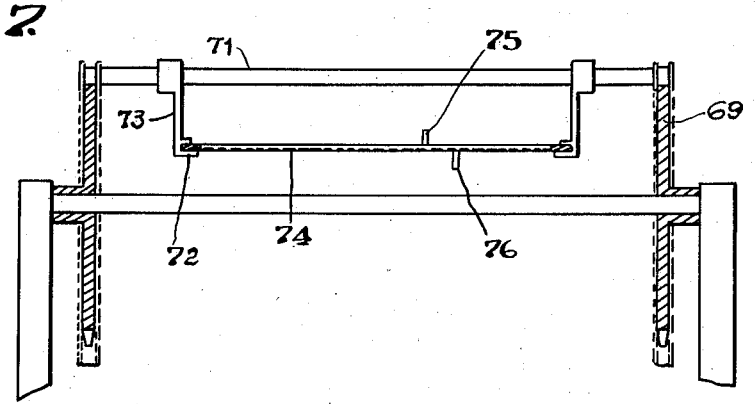

March 30, 1937.　　　J. H. SHERTS　　　2,075,667
PROCESS FOR MAKING SAFETY GLASS
Filed June 3, 1936　　　3 Sheets-Sheet 3
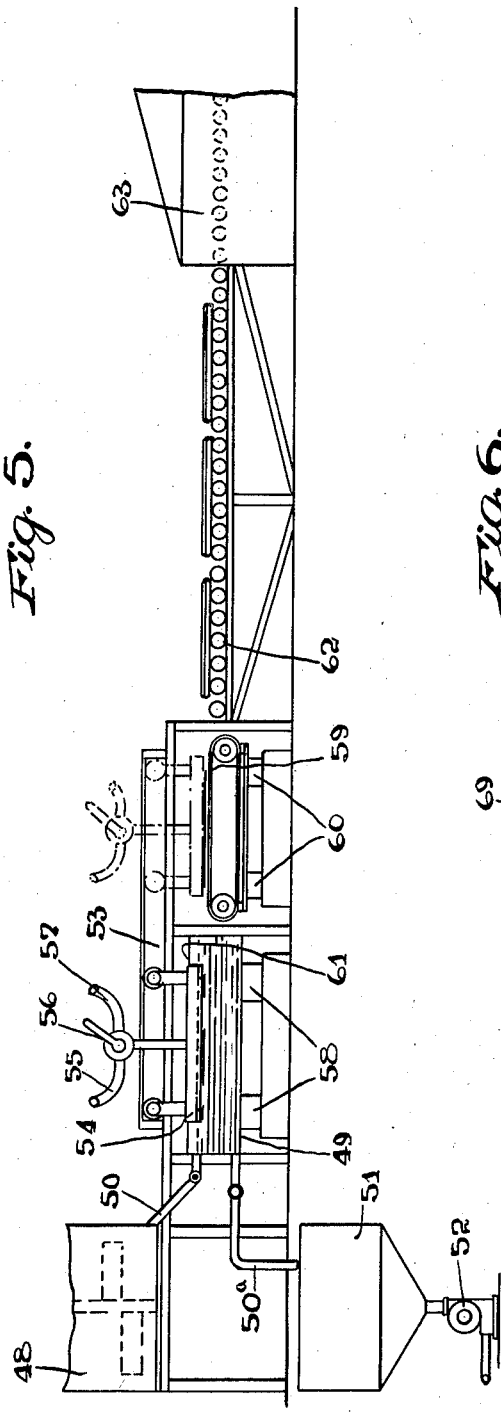
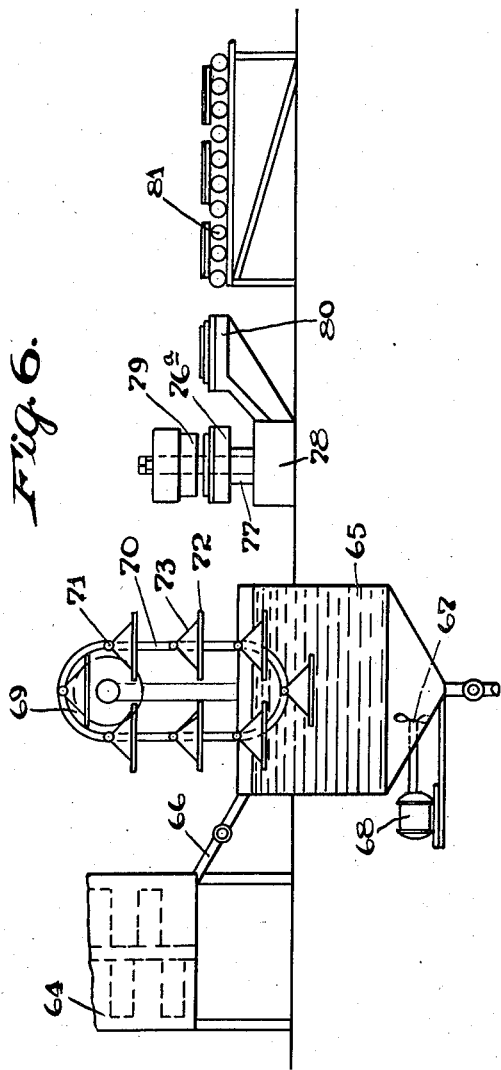
INVENTOR.
JAMES H. SHERTS
BY Bradley + Bee
ATTORNEYS.

Patented Mar. 30, 1937

2,075,667

UNITED STATES PATENT OFFICE 2,075,667

PROCESS FOR MAKING SAFETY GLASS

James H. Sherts, Tarentum, Pa., assignor to Pittsburgh Plate Glass Company, a corporation of Pennsylvania Application June 3, 1936, Serial No. 83,246

8 Claims. (Cl. 49—81)

The invention relates to a process for making safety glass and involves an improvement over the method disclosed in the application of E. H. Haux, Serial No. 758,782, filed December 22, 1934. In the Haux process, a mat layer is formed continuously from a mixture or slurry of synthetic resin, plasticizer, solvent and water, such layer being subject to a drying and curing treatment to remove the water and solvent with the application of heat and pressure to produce a tough sheet, which is then cut into sections and laminated with pairs of glass sheets in a manner similar to that commonly employed in making safety glass with cellulose nitrate or cellulose acetate as an interlayer.

In the practice of my invention, as hereinafter set forth in detail, the mixture or slurry corresponding to that of the Haux application is supplied to successive screens of the size of the glass sheets to be laminated where the major portion of the solvent and water is withdrawn, leaving a mat layer which is suitable for application to one of the glass sheets. The layer of resin transferred to and supported on the glass sheet is then subject to a drying and curing treatment followed by the application of the second glass sheet to complete the assembly. The assembly is then subject to the application of heat and pressure in a manner well known in the art to complete the product. The process presents the advantage, among others, that the resin sheets are formed of the size in which they are to be laminated, so that the expense resulting from cutting to size, and the wastage incident thereto, are avoided. Certain embodiments of the apparatus, which may be employed are shown in simple more or less diagrammatic form in the accompanying drawings, wherein:

Figure 1 is a side elevation showing one form of apparatus. Fig. 2 is a perspective view showing the tray which is employed in connection with the Fig. 1 apparatus. Figs. 3 and 4 are sectional views showing a modification, the section of Fig. 4 being fragmentary and on an enlarged scale as compared with Fig. 3. Fig. 5 is a side elevation showing another modification. And Figs. 6 and 7 illustrate still another modification, Fig. 6 being a side elevation partially in section, and Fig. 7 an enlarged section taken at right angles to the plane of Fig. 6.

Referring to Fig. 1, 8 is a mixing tank which is supplied with a mixture of plasticized synthetic resin, water and solvent, as in the Haux application heretofore referred to, the mixing element 9 being operated from the electric motor 10. This tank has an outlet 11 provided with a valve 12, which outlet discharges into a measuring tank 13, which has a swivelled outlet pipe 14 provided with a valve 15. Mounted in position to receive the discharge from the pipe 14 is a table 16 having a screen top 17 for receiving the tray 18. This tray 18 is of the form shown in Fig. 2 and comprises a frame 19 having a screen bottom 20. This tray is placed on the screen top 17 of the table beneath the outlet pipe 14 and receives an amount of the slurry or mixture sufficient to form the sheet or interlayer which is to be produced. A receiving pan 21 beneath the screen 17 receives the drainage from the mixture made up of water and solvent and this drainage is conducted through the pipe 22 to the tank 23. The tank 23 is provided with an outlet pipe 24 and a valve 25 with a pump 26 therebeneath by means of which the solvent and water may be pumped away through the pipe 27, suitable means being provided for the recovery of the solvent from this mixture. In order to promote the drainage of the liquid into the pan 17, the table is provided with vibrators 28.

After the free liquid has been removed from the layer of material in the tray 18, the scraper 29 is moved over the frame of the tray to level off the material and the tray is then transferred to the pressing table 30 mounted for vertical movement upon the plungers 31, the fixed head 32, adapted to fit into the frame 19 of the tray, being provided above the table. The table and head are preferably heated, and after the tray is placed in position, the table is moved up so that the layer of material on the tray is pressed and heated, compacting it into a firm, relatively smooth layer.

The tray is now placed on a roller runway 33 which leads through the curing chamber 34, such curing chamber being provided with suitable heating and circulating means to promote the removal of the solvent from the resin sheets during their passage therethrough. After the tray containing the resin layer is placed on the runway, a glass sheet 35a of the same size as the resin layer is placed thereon and the tray is inverted to dump the assembly on the runway, as indicated at 34, so that the resin sheet 35 is on the upper side of the glass, thus giving an opportunity for the curing operation to occur to the best advantage as the assembly travels through the curing chamber 34. When the assembly emerges from the curing chamber, as indicated at 36, a second glass sheet is placed on the resin layer, thus completing the assembly consisting of the two sheets of glass with the interposed layer of resin. This assembly is now carried through another chamber 37, in which the assembly is exposed to heat and pressure to cause the resin interlayer to adhere to the glass sheets. When the assemblies thus laminated reach the end of the roller runway, they are placed upon a receiving rack 38. These assemblies are preferably then subjected to a final pressing operation by placing them in an autoclave and exposing them to heat and pressure in a manner well known in the art.

Figs. 3 and 4 illustrate a modification of the table 16, in which suction means are provided in order to more thoroughly free the mat layer in the tray 18 from water and solvent. In this case the bottom of the table 39 consists of a pair of spaced screens 40 and 41 between which a valve plate 42 is mounted for sliding movement, such valve plate being preferably moved by means of a lever 43. The valve plate is provided with perforations adapted to register with the perforations in the two screens, when the plate is in one position, and to be out of registry with such perforations in another position. A vacuum pan 44 is provided beneath the screens with a pipe 45 leading to the tank 46. A vacuum pipe 47 takes into the pipe 45. After the tray is placed in the pan, the valve plate is moved to open position, thus permitting a suction to be applied to the tray so that the free liquid is drawn out of the mat layer into the pan 44 and runs into the sump 46 from which it is withdrawn and the solvent recovered as described in connection with the tank 23.

In the construction of Fig. 5, the slurry is supplied from a mixer 48 to the tank 49 through the pipe 50 and provision is made for draining the tank 49 by means of the pipe 50a leading to the tank 51, such tank being provided at its bottom with a pump 52 for carrying away the liquid. Mounted above the tank 49 is a trolley rail 53 carrying the vacuum pan 54. This pan is provided on its lower side with a screen corresponding in overall dimensions with the sheet of resin which is to be produced. The pan is connected by means of the pipe 55 to a vacuum device and carries a three-way valve 56 which controls the release of the vacuum to the atmosphere and permits the application of air pressure to the pan through the pipe 57. The tank 49 is mounted for vertical movement on the plungers 58 working in cylinders to which hydraulic pressure is supplied. In order to collect the layer of material upon the screen, the tank is raised to the position shown and the air exhausted from the pan 54 by manipulating the valve 56. The tank is then lowered and the pan with a layer of material supported upon its screen is moved to the right to a position over the belt 59. In moving to this position, the screen of the pan is scraped over the edge 61 of the tank, thus smoothing off the layer of material carried by the screen. The belt 59 is carried upon plungers 60 working in hydraulic cylinders and before the vacuum pan carrying the layer of material is brought to the dotted line position, a sheet of glass of the same size as the mat layer is placed upon the belt. After the resin layer is brought to position over the belt, the plungers 60 operate to lift the belt so that the glass sheet is pressed against the resin layer carried by the screen. The valve 56 is then manipulated to release the vacuum and apply air pressure through the pipe 57, thus discharging the resin sheet onto the glass sheet. The assembly as thus formed is now m ed by the belt onto the roller runway 62 and carried thereby through the curing chamber 63 which operates to remove the moisture and free solvent from the resin layer. The operation from this point on is the same as described in connection with Fig. 1.

Fig. 6 illustrates a modification, in which the mixture in the tank 64 is discharged to a tank 65 through the pipe 66. This tank is preferably provided with an agitator 67 operated from a motor. Mounted above the tank 65 upon sprockets 69 is a pair of endless chains 70 provided with transverse rods 71 on which are mounted frames 72 by means of the hangers 73. These frames 72 are grooved, as indicated in Fig. 7, to receive trays similar to the trays 18 heretofore described in connection with Fig. 1, which trays consist of a frame, in which is mounted the screen 74. This tray is adapted to be slipped into and out of position in the frame 73. In operation, the sprockets 69 are rotated to carry the trays through the liquid in the tank 65 so that a layer of material is picked up on each of the screens. As the trays emerge from the liquid, they are scraped by means of the scrapers 75 and 76, the upper scraper serving to level off the layer of material as heretofore described and the scraper 76 serving to free the bottom of the screen from material which may adhere thereto.

After the screen is removed from its support, it is placed upon the table 76a carried by a plunger 77 which works in a hydraulic cylinder 78. A head 79 is mounted in fixed position above the table and is adapted to fit into the frame of the tray. The plunger and head are preferably heated and perform the function of the parts 30 and 32 of the Fig. 1 construction. After the sheet of resin is pressed in the tray, the tray is removed and placed upon a support 80 and a sheet of glass laid thereon. This assembly is then placed upon the roller runway 81 with the glass sheet down and the assembly is carried through a curing chamber, which operates as heretofore described in connection with the curing chamber 35a of Fig. 1.

As a specific example of the materials constituting the slurry, a suitable resin is vinyl acetal, a suitable plasticizer is diethyl phthalate and a suitable solvent is methyl alcohol, it being understood, however, that a wide range of resins, plasticizers and solvents may be employed, including those set forth in the Haux application heretofore referred to. The invention is further not limited to the use of water as an ingredient of the slurry as it is possible to substitute other liquids which are non-solvents of the resin and plasticizer, such as carbon tetrachloride, ethylene dichloride, or trichlorethylene or mixtures thereof. Water is preferred, however, because of its low cost as compared with other non-solvents.

What I claim is:

1. A process of making safety glass consisting of a pair of glass sheets with an interposed layer of synthetic resin which consists in forming a mixture of synthetic resin, plasticizer, solvent and a liquid which is a non-solvent of the resin and plasticizer, collecting a layer of the mixture upon a screen, removing the free liquid from the layer while supported on the screen, transferring the layer from the screen to a glass sheet having substantially the same overall dimensions as the layer, applying heat to the layer supported on the glass sheet to remove the excess liquid therefrom, placing over the layer a second glass sheet to complete the assembly, and applying heat and pressure thereto.

2. A process of making safety glass consisting of a pair of glass sheets with an interposed layer of synthetic resin which consists in forming a mixture of synthetic resin, plasticizer, solvent and a liquid which is a non-solvent of the resin and plasticizer, collecting a layer of the mixture upon a screen, removing the free liquid from the layer while supported on the screen by drainage and the application of heat, transferring the layer from the screen to a glass sheet having substantially the same overall dimensions as the layer, applying heat to the layer supported on the glass sheet to remove the excess liquid therefrom, placing over the layer a second glass sheet to complete the assembly and applying heat and pressure thereto.

3. A process of making safety glass consisting of a pair of glass sheets with an interposed layer of synthetic resin which consists in forming a mixture of synthetic resin, plasticizer, solvent and a liquid which is a non-solvent of the resin and plasticizer, collecting a layer of the mixture upon a screen, removing the free liquid from the layer while supported in the screen by the application of suction and heat, transferring the layer from the screen to a glass sheet having substantially the same overall dimensions as the layer, applying heat to the layer supported on the glass sheet to remove the excess liquid therefrom, placing over the layer a second glass sheet to complete the assembly and applying heat and pressure thereto.

4. A process of making safety glass consisting of a pair of glass sheets with an interposed layer of synthetic resin which consists in forming a mixture of synthetic resin, plasticizer, solvent and a liquid which is a non-solvent of the resin and plasticizer, flowing a layer of the mixture onto a screen, draining the liquid therefrom, applying heat and pressure to the layer while supported on the screen, transferring the layer from the screen to a glass sheet having substantially the same overall dimensions as the layer, applying heat to the layer supported on the glass sheet to remove the excess liquid therefrom, placing over the layer a second glass sheet to complete the assembly and applying heat and pressure thereto.

5. A process of making safety glass consisting of a pair of glass sheets with an interposed layer of synthetic resin which consists in forming a mixture of synthetic resin, plasticizer, solvent and a liquid which is a non-solvent of the resin and plasticizer, flowing a layer of the mixture onto a screen, draining the liquid therefrom by the application of suction beneath the screen, applying heat and pressure to the layer while supported on the screen, transferring the layer from the screen to a glass sheet having substantially the same overall dimensions as the layer, applying heat to the layer supported on the glass sheet to remove the excess liquid therefrom, placing over the layer a second glass sheet to complete the assembly and applying heat and pressure thereto.

6. A process of making safety glass consisting of a pair of glass sheets with an interposed layer of synthetic resin which consists in forming a mixture of synthetic resin, plasticizer, solvent and a liquid which is a non-solvent of the resin and plasticizer, by dipping the screen into the mixture to pick up thereon a layer of such mixture, removing the free liquid from the layer while supported on the screen, transferring the layer from the screen to a glass sheet having substantially the same overall dimensions as the layer, applying heat to the layer supported on the glass sheet to remove the excess liquid therefrom, placing over the layer a second glass sheet to complete the assembly and applying heat and pressure thereto.

7. A process of making safety glass consisting of a pair of glass sheets with an interposed layer of synthetic resin which consists in forming a mixture of synthetic resin, plasticizer, solvent and a liquid which is a non-solvent of the resin and plasticizer, by placing the screen in a body of liquid and applying suction thereabove to pick up a layer of the mixture, inverting the screen, removing the free liquid from the layer while supported on the upper face of the screen, transferring the layer from the screen to a glass sheet having substantially the same overall dimensions as the layer, applying heat to the layer supported on the glass sheet to remove the excess liquid therefrom, placing over the layer a second glass sheet to complete the assembly and applying heat and pressure thereto.

8. A process of making safety glass consisting of a pair of glass sheets with an interposed layer of synthetic resin which consists in forming a mixture of synthetic resin, plasticizer, solvent and a liquid which is a non-solvent of the resin and plasticizer, collecting a layer of the mixture upon a screen of a thickness greater than that required to supply an interlayer of the desired thickness, passing a scraper over the layer to level it off and remove some of the mixture, removing the free liquid from the layer while supported on the screen, transferring the layer from the screen to a glass sheet having substantially the same overall dimensions as the layer, applying heat to the layer supported on the glass sheet to remove the excess liquid therefrom, placing over the layer a second glass sheet to complete the assembly and applying heat and pressure thereto.

JAMES H. SHERTS.